United States Patent [19]

Lavrisa

[11] Patent Number: 5,502,634
[45] Date of Patent: Mar. 26, 1996

[54] REGULATED AUXILIARY POWER SUPPLY

[75] Inventor: Tom Lavrisa, Kanata, Canada

[73] Assignee: Mitel Corporation, Kanata, Canada

[21] Appl. No.: 211,618

[22] PCT Filed: Oct. 9, 1992

[86] PCT No.: PCT/CA92/00443

§ 371 Date: Apr. 11, 1994

§ 102(e) Date: Apr. 11, 1994

[87] PCT Pub. No.: WO93/07674

PCT Pub. Date: Apr. 15, 1993

[30] Foreign Application Priority Data

Oct. 11, 1991 [CA] Canada .................................. 2053382

[51] Int. Cl.$^6$ .................................................. H02M 7/53
[52] U.S. Cl. ............................... 363/101; 307/44; 307/82
[58] Field of Search ..................................... 323/224, 266,
323/283, 344; 363/101; 307/43–45, 52,
58, 74, 77, 82

[56] References Cited

U.S. PATENT DOCUMENTS

| 3,414,802 | 12/1968 | Harrigan et al. | 307/44 |
| 3,657,478 | 4/1972 | Andrews, Jr. | 178/63 |
| 3,886,438 | 5/1975 | Bouman | 307/44 |
| 4,276,590 | 6/1981 | Hansel et al. | 363/71 |
| 4,760,375 | 7/1988 | Stecker | 340/310 A |
| 5,036,452 | 7/1991 | Loftus | 363/71 |
| 5,193,200 | 3/1993 | Asprey et al. | 395/800 |

FOREIGN PATENT DOCUMENTS

| 0438655 | 7/1991 | European Pat. Off. |
| 4322129 | 11/1992 | Japan . |
| 2233172 | 1/1991 | United Kingdom . |

Primary Examiner—Peter S. Wong
Assistant Examiner—Shawn Riley
Attorney, Agent, or Firm—Marks & Clerk

[57] ABSTRACT

An auxiliary regulated power supply is described for use in a system having a main load directly connected to a main regulated power supply and an auxiliary load connected to the main regulated power supply by a line in which a voltage drop occurs. The auxiliary regulated power supply comprises a pair of input terminals for connection to the line, a pair of terminals for connection to a voltage source, a pair of output terminals for connection to the auxiliary load, a circuit for sensing the voltage at the output terminals, and an arrangement for boosting the output voltage at the output terminals from a secondary voltage source as necessary to maintain it at a level appropriate for the auxiliary load.

8 Claims, 2 Drawing Sheets

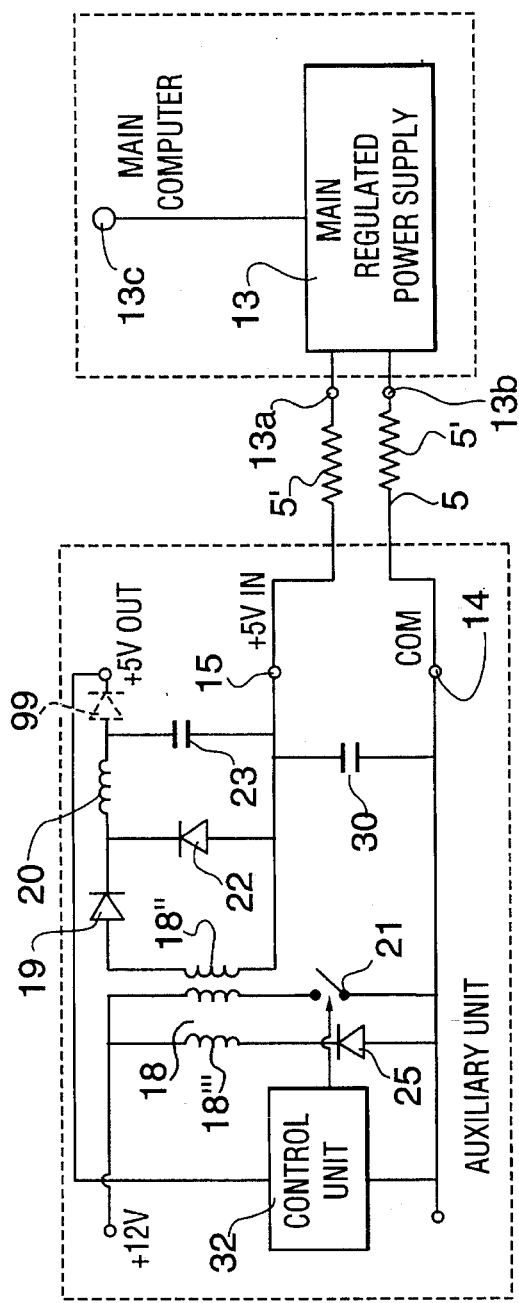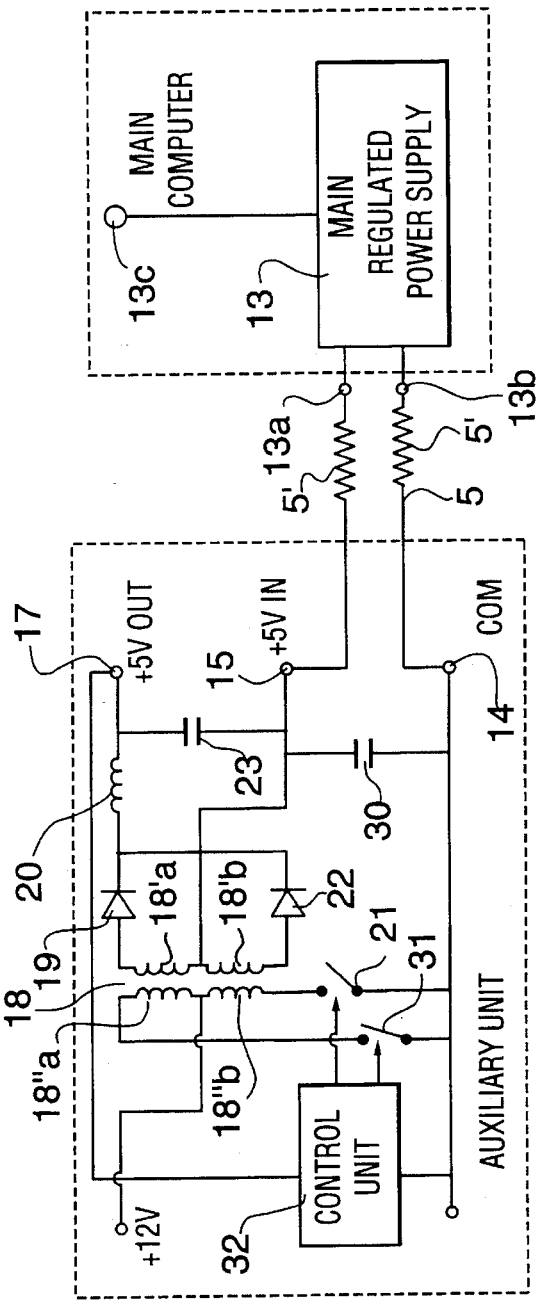

REGULATED AUXILIARY POWER SUPPLY

This invention relates to a regulated auxiliary power supply for use with personal computers and similar electronic equipment.

A personal computer includes a regulated power supply which produces the required supply voltage, normally 5 Volts, for the various loads within the computer. Such power supplies generally provide a 12 Volt output in addition. The power supply is regulated to maintain a constant voltage as the current requirements vary. A problem arises when it is desired to drive a remote terminal from the same power supply or to include circuitry in the computer that must be powered redundantly from two separate systems. If the supply is regulated according to the requirements of the main computer components, in the first case the voltage drop along the supply lead reduces the voltage at the auxiliary output, and in the second case the voltage at the auxiliary output is reduced by the series isolation diodes required to separate the two systems.

An object of the invention is to provide a regulated power supply capable of overcoming the aforementioned disadvantages.

According to the present invention there is provided in a system comprising a main load directly connected to a main regulated power supply and an auxiliary load connected to said main regulated power supply by a line in which a voltage drop occurs, said main regulated supply being connected at a near end of said line, and an auxiliary regulated power supply being connected at a far end of said line, said auxiliary regulated power supply comprising a pair of input terminals connected to said far end of said line and receiving an input voltage therefrom; a secondary voltage source; a pair of secondary terminals connected to said secondary voltage source; a pair of output terminals connected to said auxiliary load and supplying an output voltage; means for adding voltage from said secondary voltage source to said input voltage to provide said output voltage; means for applying said output voltage to said output terminals; and control means for sensing the voltage at said output terminals, said control means being operative to control said adding means in a feedback arrangement to maintain said output voltage at a constant level appropriate for said auxiliary load.

Preferably, the means for adding the voltage from the secondary source is a forward converter. At higher currents a push-pull converter may advantageously be employed.

By controlling voltage at the output terminals in this manner, a stable five volt with minimum current ripple can be readily maintained at the auxiliary output. Each ampere of current drawn from the main power supply generates one ampere of output current at the auxiliary output at the desired voltage, normally five volts.

The invention will now be described in more detail, by way of example, with reference to the accompanying drawings, in which:

FIG. 4 shows an arrangement in accordance with the invention for providing an auxiliary regulated power supply employing a forward converter; and FIG. 5 shows an arrangement in accordance with the invention for providing an auxiliary regulated power supply employing a push-pull converter.

Figure 1:
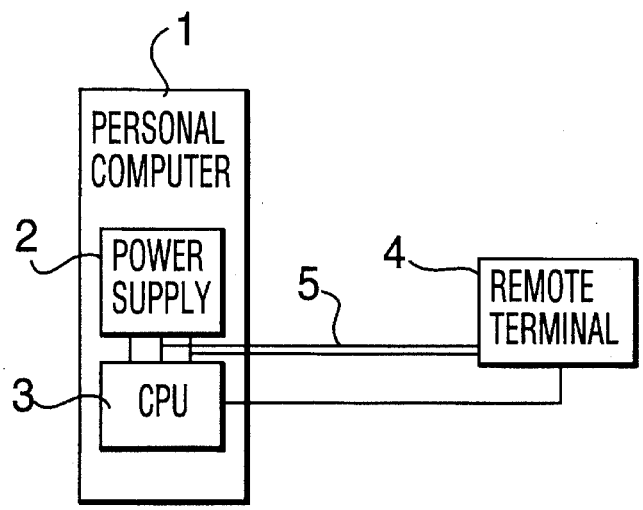
FIG. 1 shows a personal computer connected to a remote terminal running off a common power supply.

Referring now to FIG. 1, personal computer 1 comprises an internal regulated power supply 2, which drives a CPU 3 and other standard components (not shown). The computer 1 is connected to a remote terminal 4, which is driven by the same power supply 2 as the computer 1 over a lossy line 5, which causes a voltage drop across it.

A problem is that if the power supply is properly regulated for the CPU of the computer 1, the voltage drop across line 5 connecting the computer 1 to the terminal 4 causes the voltage applied to the remote terminal to become too low and consequently no longer regulated.

Figure 2:
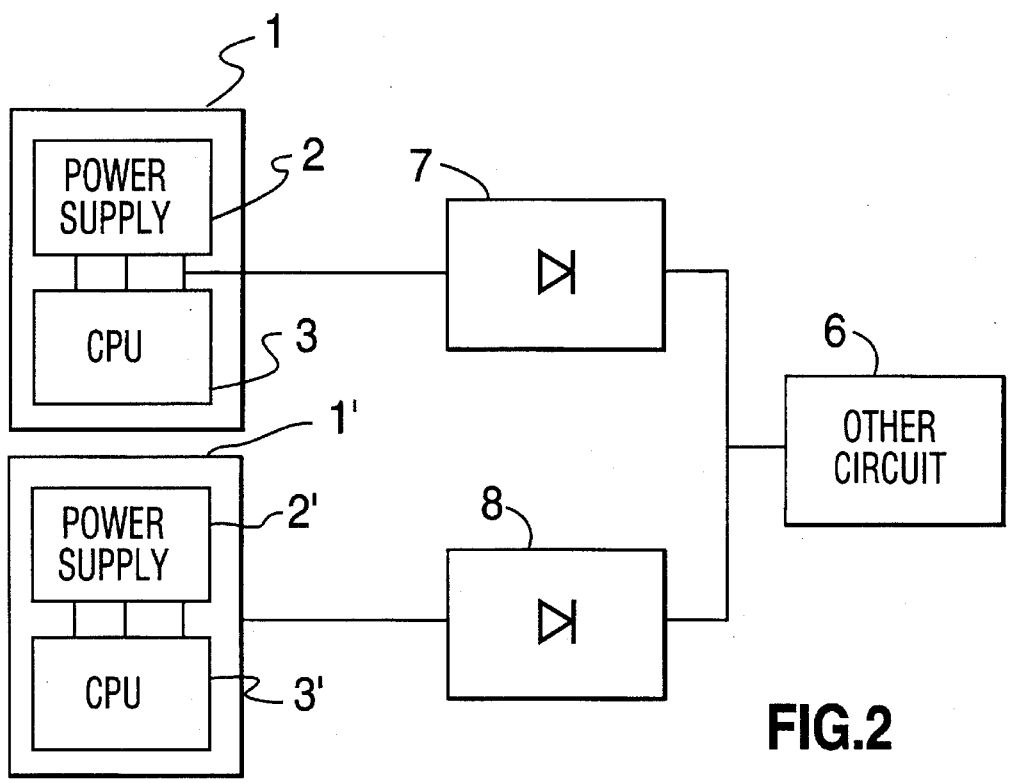
FIG. 2 shows an alternative arrangement where a circuit is powered redundantly from two separate systems.

FIG. 2 shows an alternative situation where a load 6 is required to be driven redundantly from separate power supplies 2 of computers 1, 1', which are respectively connected to the load 6 through isolation diodes 7, 8. The voltage drop across the isolation diodes causes the voltage to be applied to the load 6 to become too low. In theory, it might be considered possible to boost the voltage as seen by the input of the auxiliary load with a classic boost convertor of the type shown in FIG. 3.

Figure 3:
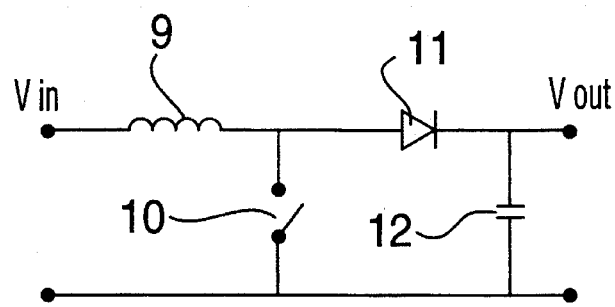
FIG. 3 shows a known boost converter circuit.

In the arrangement shown in FIG. 3 an input voltage is applied across a series combination of an inductance 9 and high speed switch 10, which in practice is a transistor. The inductance 9 acts as a current source. The current in inductance 9 ramps up when transistor 10 is on and ramps down through the diode 11 when the transistor 10 is off. A steady voltage appears at the output.

A drawback with this type of circuit, however, is that it is difficult to make it work with a nominal +5 volt input voltage, which is the most common voltage requirement for computers and similar equipment. Also, this circuit produces a high ripple current.

Referring now to FIG. 4, a conventional regulated main power supply circuit 13, supplies a regulated 5 Volt output at a main output defined by terminals 13a, 13b and in addition a 12 Volt output at terminal 13c. Power supply circuit 13 may be, for example, the main power supply of a personal computer. Alternatively, the voltage drop can be caused by isolation diodes, as shown in FIG. 2. The isolation diode can be placed as shown in FIG. 4 as 99 in broken lines. Power supply 13 is connected to input terminals 14, 15 of the auxiliary circuit by a line 5 including loss resistance 5', which causes a voltage drop in the line.

An auxiliary regulated output defined by terminals 14, 17 is derived from the voltage appearing at terminals 14, 15. Terminal 15 is connected to terminal 17 through inductance 18' forming a secondary winding of transformer 18, diode 19 and inductance 20, and also parallel diode 22. Smoothing capacitor 30 is connected across the input teriminals 14, 15.

Primary winding 18" of transformer 18 is connected to a 12 volt supply, which can conveniently be provided by the main power supply 13 through terminal 13c, in series with switch 21, which in practice is a high speed transistor driven by a control circuit 32 in dependence on the voltage at output terminal 17. Control circuit 32 is a pulse width modulated control circuit, for example having a UC3845 integrated circuit manufactured by Unitrode, or Motorola. The duty cycle of the transistor 21 is adjusted to maintain the desired 5 volts at output terminal 17 regardless of the current drawn by the auxiliary load (not shown) across terminals 14, 17. Each ampere of current drawn on the 5 volt input generates one ampere of 5 volt output current, with the extra power being taken from the 12 volt source. This extra power also overcomes any losses in the convertor itself. The transformer 18 also includes a clamp winding 18''' in series with a diode 25 to limit the voltage developed across switch 21.

The rapid operation of high speed switch 21 causes a current to be induced in inductance 20, which ramps up when the transistor 21 is on and down when it is off. Capacitor 23 acts as a smoothing capacitor to minimize ripple. The net effect of the circuit is to produce a regulated 5 Volt output at terminals 14, 17, which consists of the voltage appearing at terminals 14, 15 raised as necessary by extra voltage derived from the 12 Volt supply.

FIG. 5 shows an arrangement including a push-pull buck converter circuit. Similar components have similar reference numerals to FIG. 4. In FIG. 5, the primary and secondary windings of transformer 18' are split into half-windings 18'$a$, 18'$b$, and 18"$a$, 18"$c$ respectively, which are provided in a push-pull arrangement. Terminal 15 is connected to the common point of windings 18'$a$ and 18'$b$, and the common point of half-windings 18"$a$, 18"$b$ is connected to the 12V supply. Diode 25 is replaced by a switch 31 controlled by the control circuit 32.

The push-pull arrangement is useful at higher currents.

While many circuits can be employed to generate the added voltage for the auxiliary output, buck derived circuits are preferred in view of their low ripple current on the output capacitor.

I claim:

1. In a system comprising a main load directly connected to a main regulated power supply and an auxiliary load connected to said main regulated power supply by a line in which a voltage drop occurs, said main regulated supply being connected at a near end of said line, and an auxiliary regulated power supply being connected at a far end of said line, said auxiliary regulated power supply comprising:

a pair of input terminals connected to said far end of said line and receiving an input voltage therefrom;

a secondary voltage source;

a pair of secondary terminals connected to said secondary voltage source;

a pair of output terminals connected to said auxiliary load and supplying an output voltage;

means for adding voltage from said secondary voltage source to said input voltage to provide said output voltage;

means for applying said output voltage to said output terminals; and control means for sensing the voltage at said output terminals, said control means being operative to control said adding means in a feedback arrangement to maintain said output voltage at a constant level appropriate for said auxiliary load.

2. A system as claimed in claim 1, wherein said adding means comprises a buck converter for adding voltage to the voltage appearing at said pair of input terminals to maintain said output voltage at the appropriate level.

3. A system as claimed in claim 2, wherein said buck converter is a forward converter.

4. A system supply as claimed in claim 2, wherein said buck converter is a push-pull converter.

5. A system supply as claimed in claim 2, wherein the buck converter comprises a switching transistor connected in series with an inductance across said voltage source, diode means and capacitor means for supplying smoothed extra voltage to said auxiliary output, said switching transistor being controlled according to the voltage boosting requirements of the output voltage.

6. A system as claimed in claim 5, wherein the inductance is included in a transformer coupling the voltage source to the auxiliary output.

7. A system as claimed in claim 1, wherein said appropriate level is the same as the regulated voltage provided by the main power supply.

8. A system as claimed in claim 1, wherein said voltage source is provided by the main power supply.

* * * * *